Dec. 9, 1969    H. FALKENBERG    3,482,285
CLOSING NOZZLE FOR INJECTION MOLDING MACHINES
Filed April 25, 1967    3 Sheets-Sheet 1
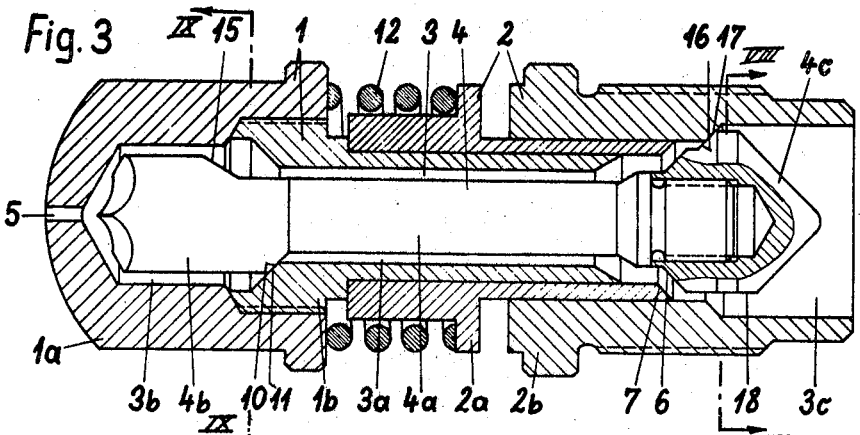
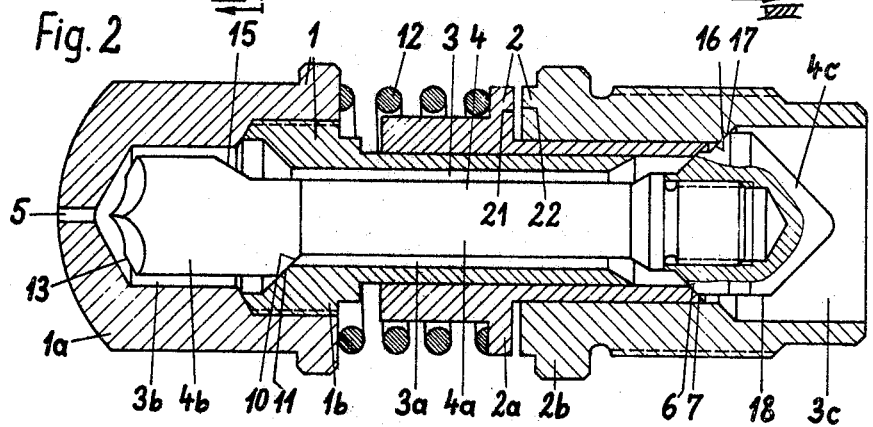
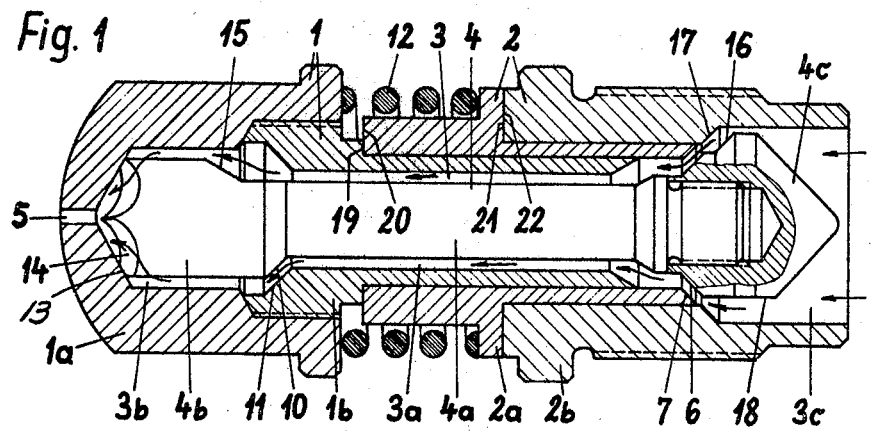
Inventor:
Harry Falkenberg
By
Walter Becker

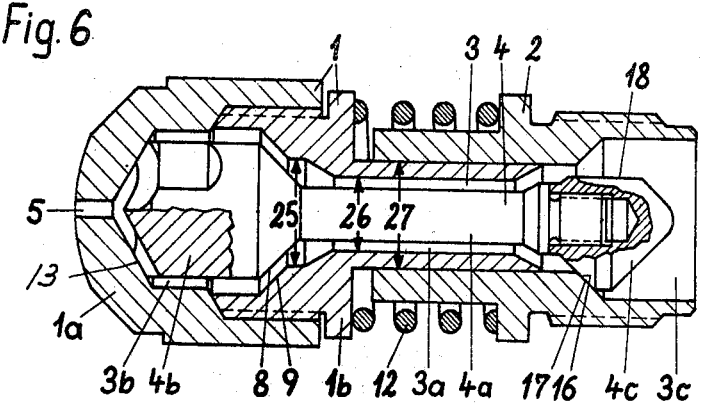
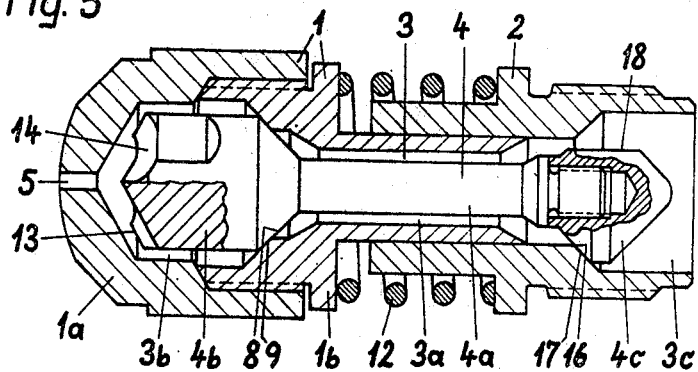
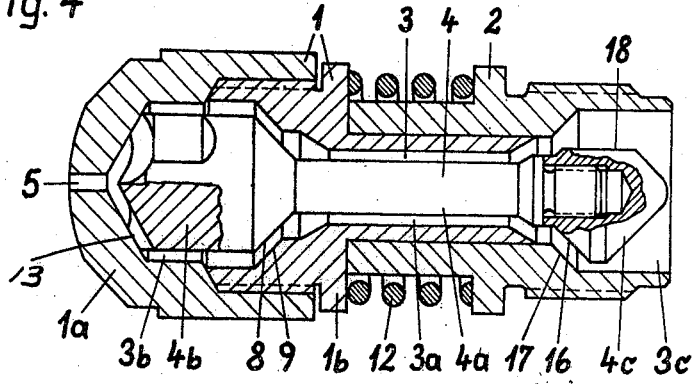

Dec. 9, 1969  H. FALKENBERG  3,482,285
CLOSING NOZZLE FOR INJECTION MOLDING MACHINES
Filed April 25, 1967  3 Sheets-Sheet 3

Inventor:
Harry Falkenberg
By Walter Becker

United States Patent Office 3,482,285
Patented Dec. 9, 1969

3,482,285
CLOSING NOZZLE FOR INJECTION MOLDING MACHINES
Harry Falkenberg, Valdorf-Ost, Germany, assignor to Friedrich Stübbe, Vlotho (Weser), Germany
Filed Apr. 25, 1967, Ser. No. 633,490
Claims priority, application Germany, Apr. 27, 1966, St 25,287
Int. Cl. B29f 1/00
U.S. Cl. 18—30                                    5 Claims

ABSTRACT OF THE DISCLOSURE

The present disclosure concerns a closing nozzle, especially for injection molding machines for processing synthetic materials, according to which the housing is subdivided into two sections having interposed therebetween closing means for continuously urging said housing sections away from each other while a nozzle core is reciprocable within said housing in the longitudinal direction thereof and defines together with said housing an annular passage from the inlet of the nozzle to the outlet thereof. The nozzle core automatically controls the flow from the nozzle inlet to and through the nozzle outlet when the nozzle is placed against a mold and the mold is removed from the nozzle. The nozzle is also operable automatically to open the passage toward the outside in case an undue pressure should develop in the nozzle which exceeds the thrust of said closing means.

---

The present invention relates to a closing nozzle for injection molding machines processing synthetic materials. Nozzles of this type are instead of open injection nozzles employed for instance when the injection material is to be prevented from leaving the nozzle after the nozzle has been lifted off from the feed head opening of the injection mold. This is of particular importance when the injection material is dilute, thin or highly fluid, or when the synthetic material to be injected is in the injection or plastifying cylinder of the injection molding machine under particularly high pressure.

With heretofore known sliding nozzles, two nozzle parts provided with passages, can, for instance, by means of a hydraulic or mechanical closing device, such as a spring, be displaced relative to each other into a closing position in such a way that the passages of one of said nozzle parts lead against a closed wall of the other nozzle part and are closed. By pressing the nozzle against the feed head of the injection mold, the nozzle parts are against the pressure of the closing device displaced relative to each other in such a way that the said passages in both nozzle parts correspond to each other, and that the injection material can flow through the passages to the nozzle opening. Due to various drawbacks occurring in particular when sensitive synthetic materials are involved the processing of which is somewhat more difficult, primarily needle closure nozzles are preferred.

With needle closure nozzles, the nozzle opening is closed by the tip of the needle the other end of which is in a sealed manner journalled in guiding means and is subjected to the pressure of a closing device, for instance of a linkage which engages the needle guiding means from the outside and which is acted upon by a spring. The opening of the nozzle is effected for instance by an increase in the pressure of the injection material which pressure acts upon the needle tip and moves the needle back against the pressure of the closing device so that the nozzle opening is freed. The injection material will then flow through one or more passages which are arranged around the needle guiding means and will pass into a passage surrounding the front portion of the needle.

By employing a plurality of bores or passages through which the injection material with heretofore known closing nozzles is conveyed into a main channel and toward the nozzle opening, it is not possible or only to a limited extent to avoid dead corners in which portions of the material deposit. When the material or its color in the injection molding machine is to be changed, it is, therefore, always necessary thoroughly to clean the closing nozzle in order to remove the residues in said dead corners. If the material particles remain in said dead corners for a longer period of time, burning of material can occur which makes it impossible to process heat sensitive synthetic materials or synthetic materials with heat sensitive color pigments.

It is, therefore, an object of the present invention to provide a closing nozzle which will overcome the above mentioned drawbacks.

It is also an object of this invention to provide a closing nozzle as set forth in the preceding paragraph, which will be of a relatively simple construction and while being relatively inexpensive will be reliable in its function.

These and other objects and advantages of the invention will appear more clearly from the following specification in connection with the accompanying drawings, in which:

FIGS. 1 to 3 respectively illustrate longitudinal sections through a closing nozzle in different positions of operation.

FIGS. 4 to 6 respectively illustrate a modified closing nozzle according to the invention in different positions of operation.

Figure 9:
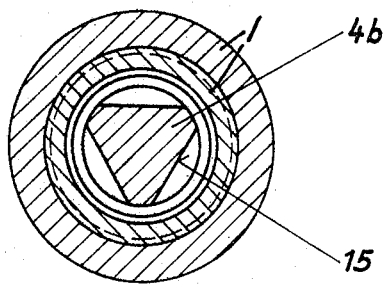
FIG. 9 is a section along the line IX—IX of FIG. 3.

The problem underlying the present invention has been solved according to the invention primarily by the fact that the nozzle housing comprises two substantially tubular housing sections which in a sealed manner slide one within the other and are displaceable relative to each other in axial direction while being provided with a single axial passage. One of said housing sections forms the head portion and comprises the nozzle opening, whereas the other housing section serves as foot portion and is connected to the injection cylinder of the injection molding machine, the passage widening from a cross sectionally reduced central portion on one hand to a passage chamber with increased cross section in the head portion and on the other hand to a passage chamber with increased cross section in the foot portion. The invention is furthermore characterized in that in said passage, there is freely floating a nozzle core provided which widens from a central portion arranged in the central section of the passage and having a reduced cross section to a head piece arranged in the passage of the housing head section and provided with an increased cross section, and on the other hand widens to a foot portion arranged in the passage chamber of the housing foot section and provided with enlarged cross section, the cross section of the head portion and the foot portion being greater than the cross section of the central portion of the passage. The invention is furthermore characterized in that in the opening position of the nozzle while the head portion and foot portion are moved against each other, between the nozzle core and the wall of the nozzle housing there is formed a free annular cross sectional path for the material to be injected while in the closing position of the nozzle when the head portion and foot portion are moved away from each other, sealing surfaces on the nozzle core and the nozzle housing are pressed against each other and block the flow of the injection material while a closing device exerts a closing force upon the head section and foot section of the nozzle housing (said force acting in the direction of displacement into closing position). When a predetermined pressure of the injection material is exceeded, the nozzle opens against the closing force of the closing device.

Referring now to the drawings in detail and FIGS. 1 to 3 thereof in particular, the nozzle housing shown therein comprises two nozzle sections 1 and 2 of a substantially tubular shape, which confine a single passage 3 extending in axial direction through both housing sections. For manufacturing reasons and also for reasons of assembly, the head section 1 of the housing comprises a mouthpiece 1a which has a nozzle opening 5, and a guiding piece 1b which is firmly screwed into the mouthpiece. The foot section 2 of the housing is adapted in a sealing manner to slide on said guiding piece 1b so that the two housing sections 1 and 2 slidable one upon the other are displaceable in axial direction with regard to each other. The foot section 2 is connected to the injection cylinder of the injection molding machine by being screwed into the end wall of the cylinder. As will be seen from the drawing, the passage 3 widens in cross section from a relatively narrow central portion 3a in one direction into a passage chamber 3b with increased cross section, said passage chamber 3b being located in the head section 1. Furthermore, the passage 3 widens from said relatively narrow central section 3a toward the other side into a passage chamber 3c with increased cross section, said passage chamber 3c being located in the foot section 2. A nozzle core 4 is freely floatingly arranged in said passage 3 and comprises a cross sectionally reduced central portion 4a arranged in the central portion 3a of passage 3. The said central portion 4a widens toward one side into a head piece 4b with increased cross section which is located in the passage chamber 3b of the head section 1. The said central section 4a widens toward the other side into a foot piece 4c with increased cross section which foot piece 4c is located in the passage chamber 3c of the housing foot section 2, said foot piece 4c being screwed onto the central portion 4a. The cross section of said head piece 4b and of said foot piece 4c are greater than the cross section of the central portion 3a of the passage 3. Head piece 4b and foot piece 4c thus limit the displaceability of the housing head section 1 and the housing foot section 2 with regard to each other so that they cannot be separated from each other. The foot section 2 of the nozzle housing comprises two parts 2a and 2b which in a sealing manner are adapted to slide one within the other and in axial direction relative to each other. Of the said two parts 2a and 2b, the said inner part 2a on one hand slides in the outer part 2b and on the other hand on the foot part 1b of the housing section 1. A closing device in the form of a spring 12 imparts upon the head section 1 and foot section 2 of the nozzle housing a closing force which acts in the direction of a displacement into the closing position shown in FIG. 2. When the nozzle moves into this closing position which will be described further below, the nozzle core 4 automatically centers itself in the passage 3. To this end, the nozzle core 4 is provided with a conical surface 6 at its foot piece 4c and with a conical surface 10 at its head piece 4b, said conical surfaces being adapted respectively to engage conical surfaces 7 and 11 of the nozzle housing 1, 2. The conical surface 6 of the foot piece 4c at the same time forms a sealing surface which faces toward the head piece 4b, whereas the conical surface 7 of the housing foot section 2 at the same time forms a sealing surface facing away from the housing section 1.

When the nozzle with its opening 5 and its mouthpiece 1a is pressed against the feed head opening of an injection mold, the head section 1 is against the thrust of spring 12 moved against the foot section 2 into the working position of the nozzle shown in FIG. 1 until the abutment surface 19 of the guiding piece 1b of the head section 1 engages the abutment surface 20 on the inner member 2a. In view of the pressure thus exerted by the spring 12 upon the inner piece 2a, the latter is simultaneously moved against the outer piece 2b until the abutment surfaces 21 and 22 thereof engage each other. The nozzle core 4 with noses 13 will then engage the head section 1 and will by the latter be carried along against the direction of flow so that the sealing surface 6 is lifted off the sealing surface 7. In this opening position of the nozzle, between the nozzle core 4 and the wall of the nozzle housing 1, 2 there is formed a free annular passage 3c, 3a, 3b for the injection molding material (see arrows in FIG. 1) while, as will be evident from the drawing, all surfaces of the nozzle housing 1, 2 and the nozzle core 4 are so inclined that all portions of the flow passage are located in the flow of the material which means are contacted by the flow of material so that no dead corners are formed in which material portions or particles can deposit. No parts of the nozzle extend transversely into the path of flow of the material so that no dead corners are formed in which the deposit of material is possible. In order at the nozzle tip to assure a free passage toward the nozzle opening 5 without the formation of dead corners, the end face of the head piece 4b of the nozzle core is provided with recesses 14 between the noses 13.

When lifting the injection nozzle off the feed head of the injection mold, the nozzle will occupy the closing position shown in FIG. 2. In this position, the spring 12 moves the housing sections 1 and 2 away from each other and the head section 1 detaches itself from the noses 13 of the nozzle core 4. Consequently, the nozzle core 4 under the pressure of the injection material is moved in flow direction until its centering and sealing surface 6 of its foot piece 4c engages the centering and sealing surface 7 of the inner piece 2a of the foot section 2. In the course of the further movement of the nozzle core 4, the latter takes along the inner piece 2a together with the head section 1 and displaces the same slightly in the direction of flow so that the abutment surfaces 21, 22 are lifted off each other until the nozzle core 4 with its abutment surface 16 on foot piece 4c engages an abutment surface 17 on the outer piece 2b of the housing section 2 whereby the stroke of the nozzle core 4 is limited. The spring 12 now presses on one hand the inner piece 2a with its sealing surface 7 against the sealing surface 6 of the nozzle core 4 so that the flow of the injection material is blocked, and on the other hand moves the head section 1 and the inner piece 2a so far apart from each other that the centering and abutment surface 11 of head section 1 engages the centering and abutment surface 10 of head piece 4b of the nozzle core 4 and also limits this stroke. With this stroke, the volume of the chamber formed by the central part 3a and the front passage chamber 3b of passage 3 is increased whereby in the passage chamber 3b an under-pressure is created which draws the injection material which is located in the nozzle opening 5, into the nozzle chamber and thus prevents this portion of the material from flowing out of the nozzle opening and thus also prevents the so-called thread pulling.

Figure 8:
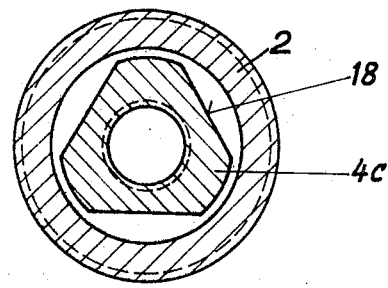
FIG. 8 is a section along the line VIII—VIII of FIG. 3.

During the heating of the injection material, especially when an overheating occurred, gases or vapors may be formed in the plastifying or injection cylinder of an injection molding machine. This is particularly true in connection with injection material comprising an inflating medium. If the injection cylinder is closed toward one side by the closing nozzle and is closed toward its filling opening, for instance, by an injection piston or a worm with a check valve, the gas pressure is unable to escape and there exists the danger of an explosion. The closing nozzle according to the invention is also explosion-proof, i.e. prevents an explosion, as will be evident in connection with FIG. 3. The abutment surface 16 of the nozzle core-foot piece 4c is provided with a plurality of axial recesses 18 distributed over the circumference of the foot piece 4c, as is particulraly clearly shown in FIG. 8, so that the abutment surface 16 forms a plurality of cams by means of which the nozzle core 4 in the closing position of the nozzle engages the abutment surface 17 of the foot portion-outer piece 2b. The injection material will thus be able through the recesses 18 to press upon the end face of the foot portion-inner piece 2a which is provided with the sealing surface 7. If the pressure in the injection cylinder exceeds the admissible pressure, the sealing surface 7 will as shown in FIG. 3 be moved off the sealing surface 6, and the foot portion-inner piece 2a will against the thrust of spring 12 be displaced in the direction of flow without movement of the nozzle core 4 which latter will as before engage the surfaces 16, 17 of the foot portion-outer piece 2b. Spring 12 rests against the head section 1 which likewise will not move since its abutment surface 11 engages the abutment surface 10 of the nozzle core-head piece 4b. This abutment surface 10 is provided with recesses 15 which are uniformly distributed over the circumference of the head piece 4b as shown in FIG. 9. The over-pressure in the injection cylinder is, therefore, able to escape from the rear passage chamber 3c of the nozzle through the recesses 18, the central portion 3a of the passage 3, the recesses 15, the front passage chamber 3b and the nozzle opening 5. As soon as the pressure in the injection cylinder has dropped to the admissible pressure to which the thrust of the spring 12 is adjusted, spring 12 will move the inner piece 2a with its sealing surface 7 again against the sealing surface 6 and thereby close the nozzle.

The closing nozzle according to FIGS. 4 to 6 fundamentally corresponds to the structure of the nozzle of FIGS. 1 to 3. The one-piece design of the housing-foot section 2 represents a simplification over the two-sectional design of FIG. 1. The conical surface 8 on the head piece 4b of the nozzle core 4 facing toward the foot piece 4c, and the conical surface 9 on foot section 1 of the nozzle housing facing away from the nozzle housing foot section 2 not only serve as abutment and centering surfaces as is the case with the surfaces 10 and 11 in FIG. 1, but also serve as sealing surfaces and thereby replace the sealing surfaces 6 and 7 in FIG. 1. The foot piece 4c of the nozzle core 4 and the housing foot section 2 are merely provided with abutment and centering surfaces 16, 17 respectively while the surface 16, similar to the embodiment of FIG. 1, is provided with a plurality of recesses 18 deposited over the circumference.

As will be evident from FIG. 4, the nozzle shown therein occupies its open position in which the head section 1 and foot section 2 of the nozzle housing are, against the thrust of spring 12, placed against each other while the nozzle core 4 having its noses 13 in engagement with the head section 1 permits the flow of the injection material.

In the closing position shown in FIG. 5, the housing sections 1 and 2 have been moved away from each other by spring 12 until the head section 1 with its sealing surface 9 engages the sealing surface 8 of the nozzle core 4 and the foot section 2 with its abutment surface 17 engages the abutment surface 16 of the nozzle core 4 whereby the stroke is limited. Since the seal with this embodiment is effected on the head piece 4b of the nozzle core 4, the pressure of the injection material can from the injection cylinder of the injection molding machine spread through the rear passage chamber 3c and the central portion 3a of the passage 3 to the sealing surfaces 8, 9 while spring 12 counteracts the pressure of the injection material and presses the sealing surfaces 8, 9 against each other.

Also this nozzle has inherent thereto a safety provision against explosion, which safety provision is best understood in connection with FIG. 6. That portion of the guiding piece of head section 1 which is located in front of the sealing surfaces 8, 9 when viewing the arrangement in the direction of flow, extends into the passage of the housing section 2 and has an outer diameter 27 and an inner diameter 26. From these diameters 26 and 27, the annular effective cross section is ascertained which is acted upon in the direction of flow by the pressure of the injection material. Toward the sealing surfaces 8, 9, the bore of the guiding piece 1b widens from the inner diameter 26 to the inner diameter 25. From the diameters 26 and 25, the annular effective cross section can be ascertained which in the direction counter to the direction of flow will be acted upon by the pressure of the injection material. The diameter 25 is greater than the diameter 27 so that the cross sectional surface acted upon in a direction counter to the direction of flow is greater than the cross sectional surface acted upon in the direction of flow. In this way, that portion of the housing section 1 which when viewing in the direction of flow is located ahead of the sealing surfaces 8, 9 has been designed as annular differential piston the smaller piston surface of which is acted upon in the direction of flow, whereas, the larger piston surface is acted upon in a direction counter to the direction of flow. Thus, if the pressure of the injection material in the injection cylinder becomes excessive, which pressure spreads through the passage 3 of the nozzle to the sealing surfaces 8, 9, it will be evident that in view of the differential piston effect of the guiding piece 1b, the entire head section 1 will against the thrust of spring 12, which has been dimensioned accordingly, be moved toward the foot section 2. The sealing surfaces 8, 9 lift themselves off each other as illustrated in FIG. 6, and the injection material can flow through passage 3 and out of the nozzle opening 5. As soon as the pressure has dropped again to a permissible value or the predetermined normal value, and as soon as the thrust of the spring again becomes greater than that of the differential piston, the nozzle returns to its closing position shown in FIG. 5.

Figure 7:
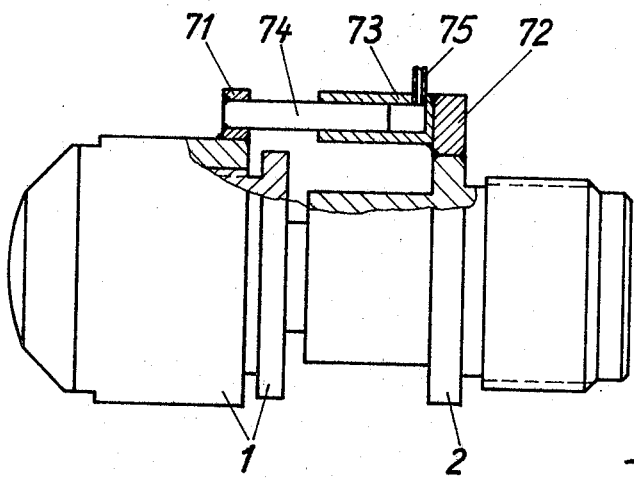
FIG. 7 shows in view and partly in section the nozzle of FIG. 6 but with a pneumatically or hydraulically operable closing device instead of a mechanically operable closing device.

Instead of a mechanical closing device as for instance in the form of spring 12, also for instance a pneumatic or hydraulic closing device can be employed as shown in FIG. 7. As will be seen from FIG. 7, the spring 12 of FIGS. 1–6 has according to the embodiment of FIG. 7 been replaced by a fluid operable cylinder piston system with the cylinder 73 thereof connected to a support 72 which in its turn is connected to the nozzle section 2, whereas the piston 74 is connected to a support 71 which in its turn is connected to the nozzle section 1. The fluid, e.g. compressed air or oil under pressure, is introduced and withdrawn through conduit 75.

The automatic opening of the nozzle against the closing force of the closing device not only offers protection against explosion when the pressure of the injection material becomes excessive or exceeds the closing force for which the closing device is adjusted, but also yields the following advantage. For instance, with a change in the material or color, it is possible by means of the injection device to increase the pressure in the injection cylinder to such an extent that the closure nozzle will open and the residues of the previously employed injection material will be displaced by the new injection material and will be ejected.

It is, of course, to be understood that the present invention is, by no means, limited to the particular embodiments shown in the drawings but also comprises any modifications within the scope of the appended claims.

What I claim is:

1. A closing nozzle, especially for injection molding machines processing synthetic materials, which includes: a housing having first substantially tubular means and second substantially tubular means axially slidable one upon the other in a substantially sealing manner, said first tubular means forming the head portion of said nozzle and being provided with a nozzle opening adapted to be placed in engagement with a mold, and said second tubular means forming the tail portion of said nozzle and being provided with an inlet adapted to be connected to the injection cylinder of an injection molding machine for receiving therefrom material to be injected into a mold through said nozzle opening, said first and second tubular means defining with each other passage means extending through said nozzle in axial direction thereof for communication with said inlet and said nozzle opening, said passage means having a central portion and having two end portions respectively located in said head and tail portions and having a greater diameter than said central portion, a nozzle core freely floatingly arranged in and extending in axial direction of said passage means and having a central portion and two end portions respectively located in said head and tail portions and having a larger diameter than said last mentioned central portion and also than said central portion of said passage means, said nozzle core together with said first and second tubular means defining an annular passage extending in the axial direction of said nozzle from said head portion to said tail portion, said nozzle core and said housing being movable relative to each other selectively into an opening position for establishing free communication between the annular passage portion in said tail portion and said nozzle opening for effecting an injection molding operation in which opening position said first and second tubular means of said housing are moved against each other and also being movable selectively into a closing position in which said first and second tubular means of said housing are moved away from each other and in which one of the end portions of said nozzle core engages the respective adjacent end portion of said housing and interrupts communication between said inlet and said nozzle opening, and closing means continuously urging said housing into said closing position with said nozzle core and being adapted to be overcome by a pressure exceeding a predetermined pressure of the injection material acting upon one of said tubular means counter to and in excess of the thrust exerted by said closing means upon said housing.

2. A nozzle according to claim 1, in which those surfaces of said nozzle core and said tubular housing means which engage each other in said closing position are conical for automatically centering said nozzle core in said passage means defined by said first and second tubular means.

3. A nozzle according to claim 1, in which said tail portion comprises two coaxially and telescopically movable and substantially sealingly interengaging members the outer one of which has its inner periphery provided with abutment means for limiting the movement of the nozzle core in the direction toward said head portion, while the inner one of said two telescopically interengaging members is provided with a sealing surface facing away from said nozzle opening for sealing engagement with a corresponding surface of said nozzle core in the closing position of the latter, said closing means continuously exerting a force in closing direction upon the inner one of said two telescopically interengaging members.

4. A nozzle according to claim 1, in which that end portion of the nozzle core which is located in said first tubular means is provided with a first conical sealing surface facing away from said nozzle opening while the inner periphery of said first tubular means is provided with a second conical sealing surface for cooperation with said first conical sealing surface of said nozzle core, said first tubular means being provided with differential piston surface means communicating with said annular passage, the arrangement being such that the larger differential piston surface means faces toward said nozzle opening whereas the smaller differential piston surface means faces toward said inlet, both of said differential surface means being located ahead of said first and second conical sealing surfaces when looking from said tail portion toward said nozzle opening.

5. A nozzle according to claim 1, in which said second tubular means forming the tail portion of said nozzle consists of a single tubular member having a portion of said first tubular means axially and directly slidably arranged therein, said closing means being interposed between said first tubular means and said single tubular member.

References Cited

FOREIGN PATENTS

| | | |
|---|---|---|
| 912,194 | 4/1946 | France. |
| 29,832 | 1/1965 | Germany. |
| 42,624 | 12/1965 | Germany. |

OTHER REFERENCES

Fachzeitschrift, "Kuntstoffe," Issue 2, 1962, vol. 52, p. 105.

J. SPENCER OVERHOLSER, Primary Examiner

MICHAEL O. SUTTON, Assistant Examiner